US009718262B2

(12) United States Patent
Marks et al.

(10) Patent No.: US 9,718,262 B2
(45) Date of Patent: Aug. 1, 2017

(54) ROLL FORMING COMPOSITE COMPONENTS

(71) Applicant: AIRBUS OPERATIONS LIMITED, Bristol (GB)

(72) Inventors: Oliver Marks, Bristol (GB); Steven Evans, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 205 days.

(21) Appl. No.: 14/793,565

(22) Filed: Jul. 7, 2015

(65) Prior Publication Data

US 2016/0009061 A1 Jan. 14, 2016

(30) Foreign Application Priority Data

Jul. 8, 2014 (GB) .................................. 1412157.8

(51) Int. Cl.
| *B29C 53/04* | (2006.01) |
| *B29C 70/42* | (2006.01) |
| *B32B 37/00* | (2006.01) |
| *B32B 38/00* | (2006.01) |
| *B29C 70/30* | (2006.01) |

(52) U.S. Cl.
CPC ........ *B32B 37/0053* (2013.01); *B29C 53/043* (2013.01); *B29C 70/30* (2013.01); *B29C 70/42* (2013.01); *B32B 38/0004* (2013.01); *B32B 2305/72* (2013.01); *B32B 2309/105* (2013.01); *Y10T 156/1008* (2015.01); *Y10T 156/1044* (2015.01)

(58) Field of Classification Search
None
See application file for complete search history.

(56) References Cited

U.S. PATENT DOCUMENTS

| 5,074,139 A | 12/1991 | Elliott |
| 5,142,894 A | 9/1992 | Gutowski |
| 6,701,990 B1 | 3/2004 | Burley et al. |
| (Continued) | | |

FOREIGN PATENT DOCUMENTS

| EP | 2524740 A1 | 11/2012 |
| WO | 0024563 A1 | 5/2000 |
| WO | 2005105413 A2 | 11/2005 |

OTHER PUBLICATIONS

B. Tomas Aström; "Thermoplastic Composites Manufacturing" In: Composites, Dec. 1, 2001, ASM International, USA, pp. 570-578.

(Continued)

*Primary Examiner* — Barbara J Musser
(74) *Attorney, Agent, or Firm* — Hauptman Ham, LLP

(57) ABSTRACT

A method of roll forming a plurality of composite components. The method includes the steps: (a) laying a plurality of blanks onto a carrier strip, each blank including a stack of sheets of uncured composite material contacting a respective contact part of the carrier strip; (b) after step (a), forming the blanks and their respective contact parts of the carrier strip with a desired cross-sectional profile by passing the carrier strip carrying the blanks through a series of sets of rollers, each set of rollers performing an incremental part of a bending operation until the desired cross-sectional profile is obtained; (c) after step (b), separating the blanks along with their respective carrier strips from the rest of the carrier strip; and (d) before or after step (c), curing the blanks.

12 Claims, 4 Drawing Sheets

(56) References Cited

U.S. PATENT DOCUMENTS

| | | |
|---|---|---|
| 2002/0104355 A1 | 8/2002 | Patty |
| 2004/0244454 A1 | 12/2004 | McDonald |
| 2005/0269016 A1 | 12/2005 | Oldani et al. |
| 2009/0230589 A1 | 9/2009 | Rossi et al. |

OTHER PUBLICATIONS

European Search Report issued in EP Application No. 15175754.9; dated Dec. 7, 2015.

Search Report dated Jan. 7, 2015 in Great Britain Application No. 1412157.8.

ROLL FORMING COMPOSITE COMPONENTS

RELATED APPLICATIONS

The present application claims priority from Great Britain Application Number 1412157.8, filed Jul. 8, 2014, the disclosure of which is hereby incorporated by reference herein in its entirety.

FIELD OF THE INVENTION

The present invention relates to a method of roll forming composite components.

BACKGROUND OF THE INVENTION

Roll forming is a known process, in which a long strip of material is passed through sets of rollers, each set performing only an incremental part of the bend, until the desired cross-section profile is obtained. Most known methods of roll forming are ideal for producing constant-profile parts with long lengths and in large quantities, but are not well suited to forming multiple small components.

A method of roll forming small components is described in U.S. Pat. No. 5,074,139. A lead frame holds a plurality of semiconductor devices. The lead frame and semiconductor devices are passed through a roll forming machine, then the devices are cut free from the lead frame as a final step.

SUMMARY OF THE INVENTION

The invention provides a method of roll forming a plurality of composite components, the method including the steps: (a) laying a plurality of blanks onto a carrier strip, each blank including a stack of sheets of uncured composite material contacting a respective contact part of the carrier strip; (b) after step (a), forming the blanks and their respective contact parts of the carrier strip with a desired cross-sectional profile by passing the carrier strip carrying the blanks through a series of sets of rollers, each set of rollers performing an incremental part of a bending operation until the desired cross-sectional profile is obtained; (c) after step (b), separating each blank along with its respective contact part of the carrier strip from the rest of the carrier strip; and (d) before or after step (c), curing the blanks.

The invention provides a fast method of forming large numbers of small composite components. Both the blank and its respective contact part of the carrier strip are bent during the bending operation, and then separated from the rest of the carrier strip. Each blank remains in contact with its respective contact part of the carrier strip as they are separated together from the rest of the carrier strip.

The bent blanks may be separated from their respective bent contact parts of the carrier strip before step (d). However more preferably the carrier strip is formed from an uncured material, and in step (d) each blank and its respective contact part of the carrier strip are cured in contact with each other so that they become joined to each other by co-curing. Thus the contact part of the carrier strip becomes an integral part of the finished article.

The carrier strip may be a non-composite material, but more preferably it is formed from a composite material, which optionally is the same uncured composite material as the blanks.

The blanks may extend across a full width of the carrier strip. In this case, in step (c) each blank (along with its respective contact part of the carrier strip) is separated from the rest of the carrier strip by cutting the carrier strip across its full width, severing the carrier strip. Alternatively each contact part of the carrier strip is surrounded on all sides by a respective surplus part of the carrier strip which is not contacted by a blank and which is separated from the contact part of the carrier strip in step (c). This enables step (c) to be performed without severing the carrier strip, making the surplus carrier strip material easier to handle.

The bending operation forms one or more bends in the blanks and their respective contact parts of the carrier strip. Optionally the method further comprises forming one or more further bends in the blanks and their respective contact parts of the carrier strip after step (c) and before step (d). This further bending operation may be performed by press forming or any other suitable bending process.

Preferably the carrier strip has a thickness (in a thickness direction of the stack) which is less than a thickness of the blanks (in a thickness direction of the stack).

Preferably the carrier strip has a thickness in the range of 1-5 mm.

Optionally step (c) comprises cutting through the carrier strip for instance with an ultrasonic knife. Typically step (c) comprises cutting the carrier strip around a full periphery of the blank.

The method may be used to form a rib foot for attaching a rib to a cover of an aircraft wing, or a variety of other structural composite components.

BRIEF DESCRIPTION OF THE DRAWINGS

Embodiments of the invention will now be described with reference to the accompanying drawings, in which:

FIG. 6b is a cross-sectional view of the carrier strip and blank after roll forming using the rollers of FIG. 6a.

DETAILED DESCRIPTION OF EMBODIMENT(S)

A method of roll forming a plurality of composite blanks is shown in FIGS. 1-6. In a first step, a flat master stack 1 of plies of "pre-preg" (uncured composite material) is laid up. Each ply in the master stack consists of unidirectional carbon fibres impregnated with an epoxy resin matrix. The carbon fibres in each ply of the master stack are oriented at either 0 degrees, +/−45 degrees or 90 degrees.

Figure 2:
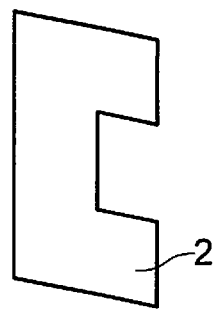
FIG. 2 shows a flat blank cut from the master stack.
Figure 1:
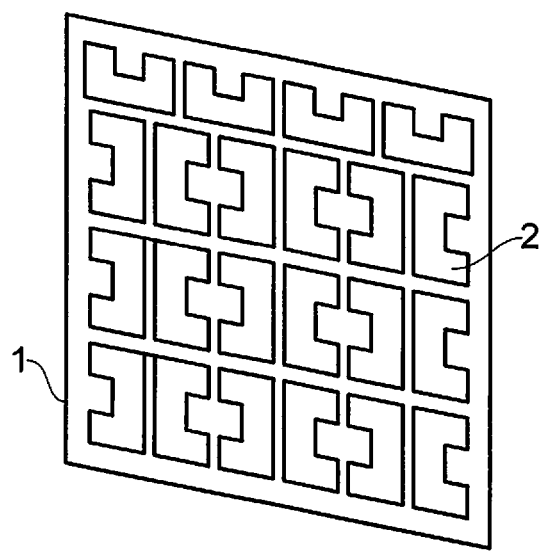
FIG. 1 shows a master stack.
Figure 4:
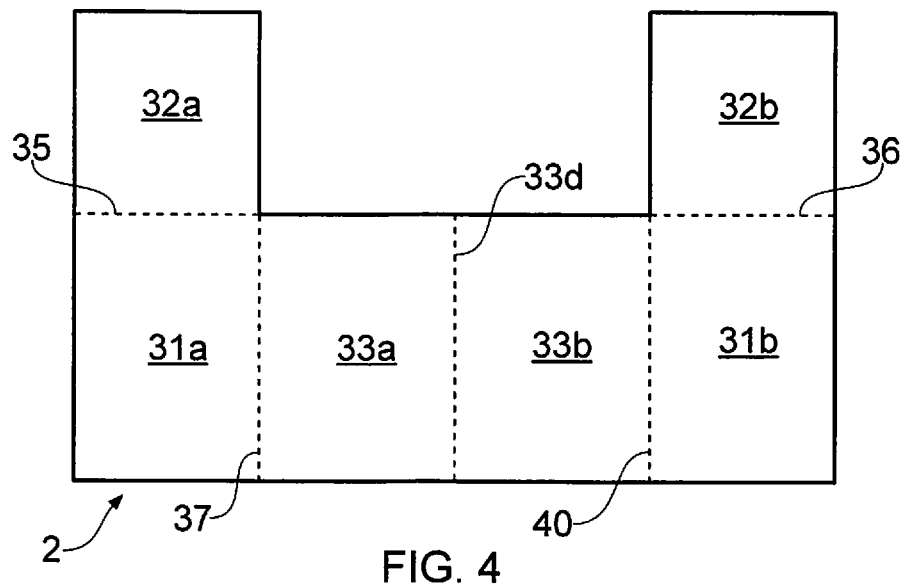
FIG. 4 shows the various parts of one of the flat blanks.

Multiple net shapes or blanks 2 are then cut or punched from the master stack 1, each blank comprising a stack of sheets of uncured composite material like the master stack 1 from which it originates. The outlines of twenty of such blanks 2 are shown in FIG. 1, and one of such blanks 2 is shown in FIGS. 2 and 4. As shown in FIG. 4, each blank 2 is made up of six rectangular parts 31a,b; 32a,b; and 33a,b.

Figure 3:
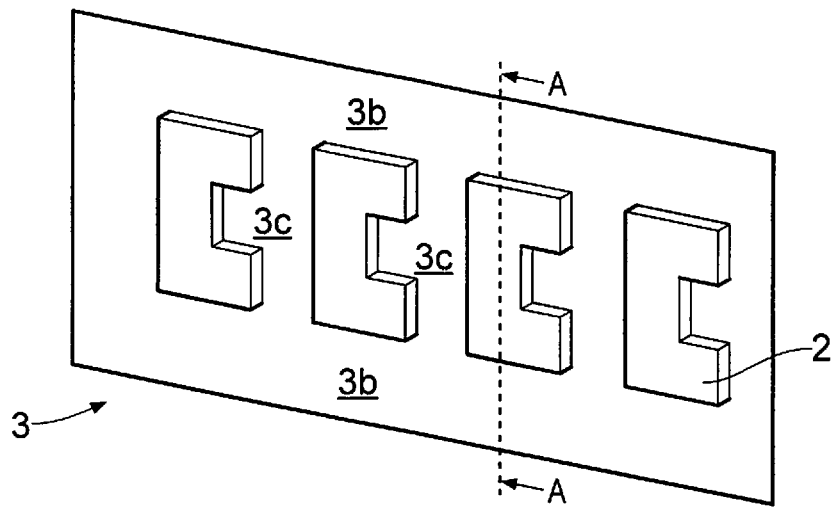
FIG. 3 shows a short part of a carrier strip carrying four blanks.

The flat blanks 2 are then laid onto a carrier strip 3 as shown in FIG. 3. Only a short length of the carrier strip 3 is shown in FIG. 3—carrying four blanks 2. The blanks are laid along the length of the carrier strip in the same orientation, separated from each other by end gaps 3c and from the sides of the carrier strip 33 by side gaps 3b.

Figure 5:
FIG. 5 is a cross-sectional view of the carrier strip taken across its width along a line A-A in FIG. 3.

Each blank 2 contacts a respective contact part 3a of the carrier strip as shown in FIG. 5. Each contact part 3a of the carrier strip is surrounded on all sides by a respective surplus part of the carrier strip which is not contacted by a blank. This surplus part of the carrier strip (occupying the gaps 3b,c shown in FIG. 3) forms a "picture frame" around the full periphery of each blank 2.

The carrier strip 3 is formed from the same uncured "pre-preg" composite material as the blanks 2, which is "tacky" so that the blanks weakly adhere to the carrier strip. The carrier strip is thinner than the blanks—for instance it may consist of 4-8 plies of pre-preg (total thickness 1-2 mm), whereas each blank may consist of 16-20 plies of pre-preg (thickness 4-5 mm) for example. In one example each blank has 16 plies and the carrier strip has 8 plies—giving a total thickness of 24 plies (6 mm). The carrier strip must be sufficiently thick to be able to hold its shape after roll forming (so the minimum thickness of the carrier strip is about 1 mm) as well as being sufficiently thin to enable it to be cut easily by an ultrasonic knife (so the maximum thickness of the carrier strip 3 is about 5 mm).

Figure 6A:
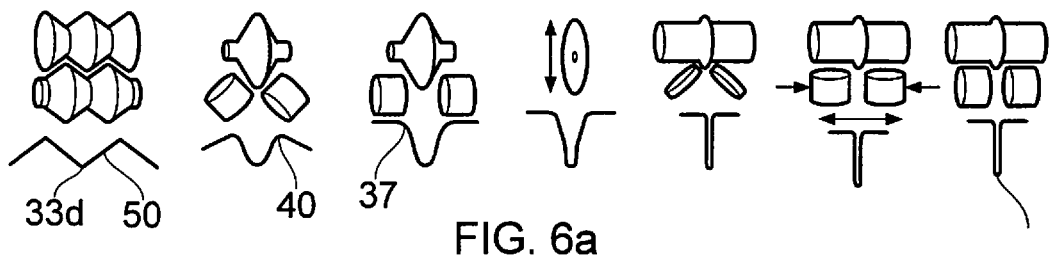
FIG. 6a shows a series of seven sets of rollers, each set of rollers performing an incremental part of a bending operation.
Figure 6B:
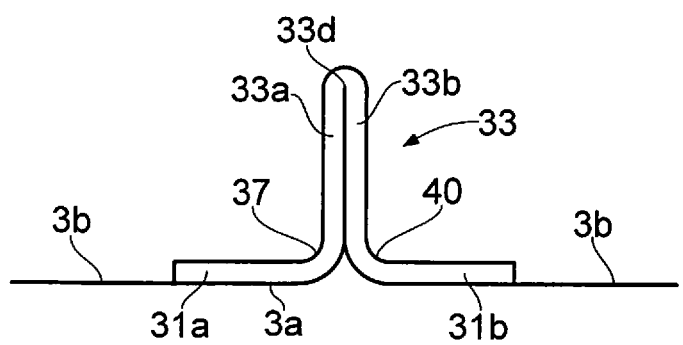

Next the flat blanks and their respective flat contact parts 3a of the carrier strip are roll-formed into a desired cross-sectional profile shown in FIG. 6b by passing the carrier strip carrying the blanks through a series of sets of rollers, each set of rollers performing an incremental part of a bending operation until the desired cross-sectional profile is obtained.

An example of such a bending operation is illustrated in FIG. 6a, which shows a series of seven sets of rollers, each set of rollers performing an incremental part of the bending operation. Underneath each set of rollers, the cross-sectional profile created by that set of rollers is shown—starting from a W-shaped profile 50 and ending in a T-shaped profile 51.

During the bending operation, each blank (and its associated contact part 3a of the carrier strip) is bent along a fold line 37 to form a generally horizontal first base part 31a, along a fold line 40 to form a generally horizontal second base part 31b, and along a fold line 33d to form an upstanding blade 33. The blade 33 is formed by a pair of blade parts 33a, 33b which are folded back to back and extend from a blade foot to a blade tip where they meet to form a bight.

Next the bent blanks are separated (along with their respective bent contact parts 3a of the carrier strip) from the rest of the carrier strip, leaving surplus material which is then discarded. As each bent blank is output from the roll forming machine, an ultrasonic knife cuts through the carrier strip around the full periphery of the bent blank. The knife may be operated by hand, or it may be automatically moved around the blank by a robot arm. This cutting process does not cut across the full width of the carrier strip, so the surplus material remains intact as an elongate strip, with holes where the bent blanks (along with their respective contact parts of the carrier strip) have been removed. Alternatively the knife may cut across the full width of the carrier strip, before trimming away the surplus carrier strip around the edge of the bent blank.

As shown in FIG. 4, each blank has protruding flange parts 32a,b which are not bent in the roll forming operation. After the bent blanks are separated from the surplus part of the carrier strip, these flange parts 32a,b are bent along fold lines 35, 36 by a press-forming machine to form a finished rib foot 30 shown in FIGS. 7 and 8.

Figure 7:
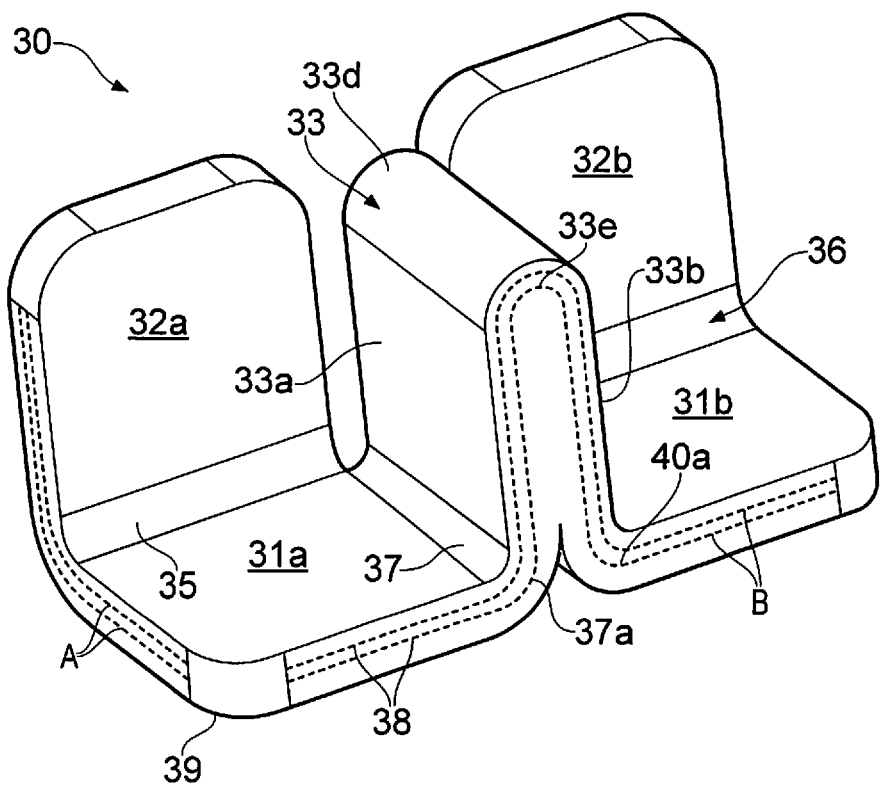
FIG. 7 shows a rib foot formed from the bent blank and carrier strip of FIG. 6.
Figure 8:
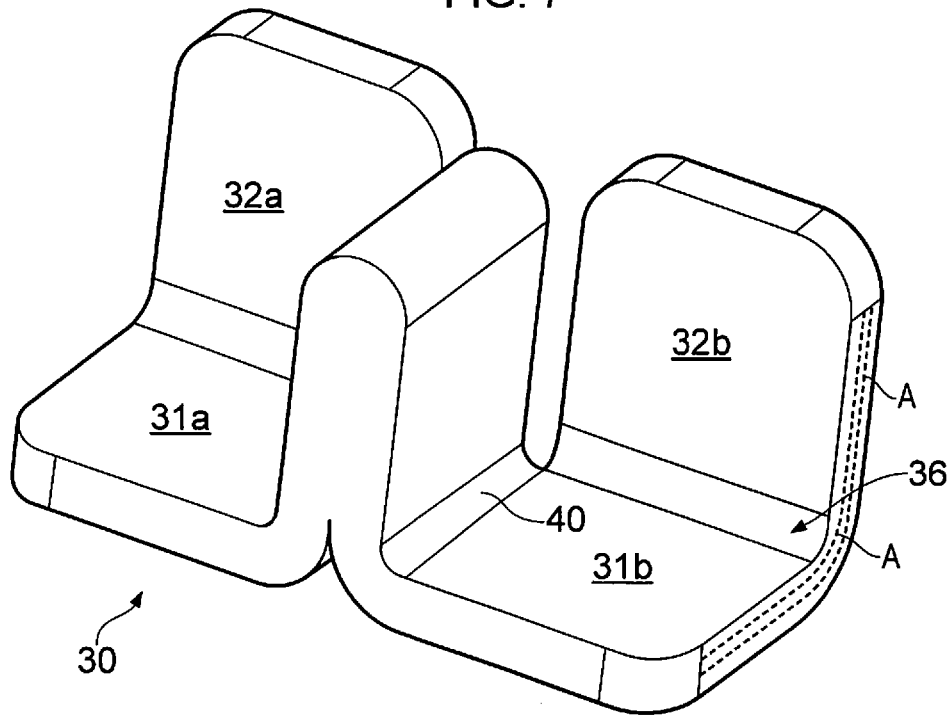
FIG. 8 is a view of the rib foot of FIG. 7 from a different direction.

The carbon fibres in each ply of the blank and the carrier strip are oriented at either 0 degrees, +/−45 degrees or 90 degrees. FIGS. 7 and 8 show by way of example four 0 degree fibres A and two 90 degree fibres B. The 0 degree fibres A shown in FIG. 7 run continuously from the rib foot base part 31a into the flange 32a via a curve at the folded corner 35. Similarly the 0 degree fibres A shown in FIG. 8 run continuously from the rib foot base part 31b into the flange 32a via a curve at the folded corner 36. As shown in FIG. 7, some of the 90 degree fibres B run continuously from the base part 31a into the base part 31b via a first curve 37a at the folded corner 37, a bight 33e at the blade tip 33d, and a second curve 40a at the folded corner 40. In this way, loads are transferred by the carbon fibres around each of the folded corners.

Figure 9:
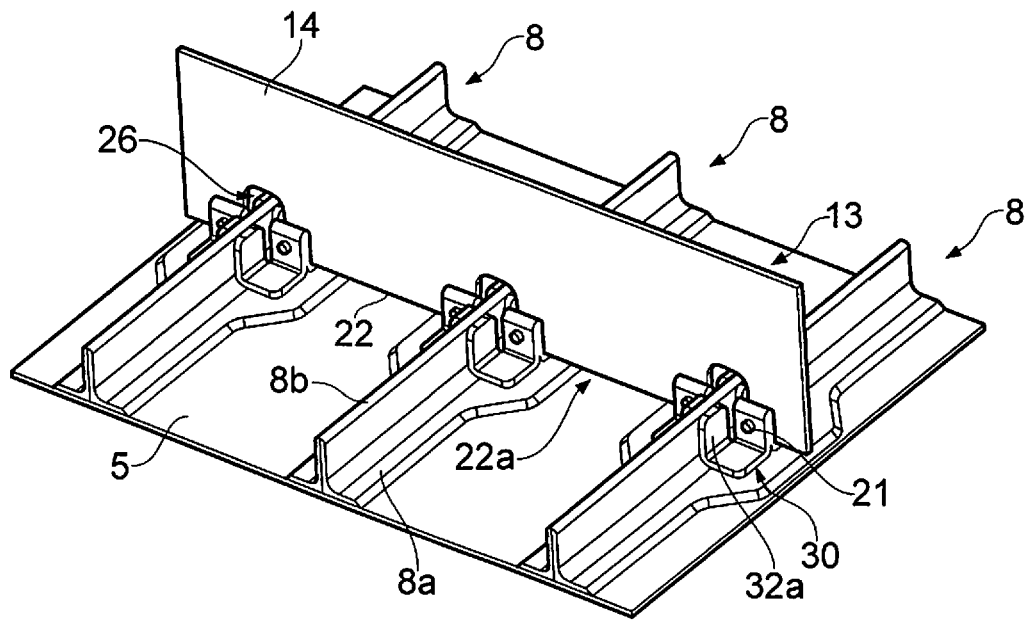
FIG. 9 shows a cover/rib/stringer interface of an aircraft wing.

FIG. 9 shows a structure forming part of the interface between a rib 13 and the lower cover 5 of an aircraft wing, including three stringers 8 and six rib feet 30. Each rib foot 30 has been formed by the method described above with reference to FIGS. 1 to 8.

Figure 10:
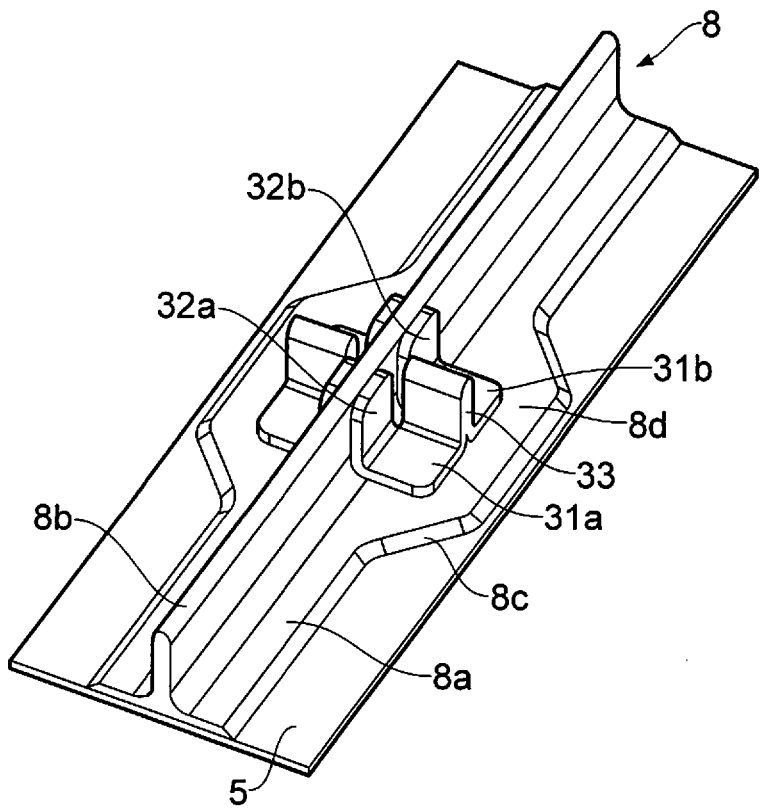
FIG. 10 shows part of the structure of FIG. 9, with the rib omitted so two rib feet can be seen clearly.

The stringers 8 are Carbon Fibre Reinforced Polymer (CFRP) laminate components. Each stringer 8 has a T-shaped cross-section with a pair of flanges 8a co-cured to the cover 5, and a web or blade 8b extending upwardly from the flanges 8a away from the cover 5 to a free upper edge. Each flange 8a has a tapering lateral edge 8c and a protruding grow out region 8d (FIG. 10). The stringers 8 have a "roll-formed" structure in which the flanges 8a and web 8b are formed from a single folded sheet.

The rib 13 comprises a planar metallic web 14 connected to the lower cover 5 by the CFRP laminate rib feet 30.

The flanges 32a, 32b of each rib foot are co-cured to the stringer web 8b, and the base parts 31a, 31b are co-cured to the protruding grow-out region 8d of the stringer flange 8a. This co-cured joint (without bolts) between the base parts 31a, 31b and the stringer flange 8a mean that no drilled bolt holes need to be provided in the cover 5 or the stringer flange 8a. This enables the thickness (and hence weight) of the cover 5 to be reduced compared with a bolted arrangement. The lack of external bolts in the cover 5 also provides protection against lightning strike and improved fuel tank sealing.

Each stringer 8 is joined to the rib by a pair of rib feet 30—one on each side of the stringer web 8b which are mirror images of each other.

The blade 33 of each rib foot is joined to the rib web 14 by bolts 21 (shown in FIG. 9).

The rib web 14 has planar inboard and outboard faces on opposite sides of the rib which meet at a lower edge 22 shown in FIG. 9, and an upper edge (not shown). Only the inboard face of the rib web is visible in FIG. 9. The lower edge 22 is separated from the inner surface of the cover 5 by a gap 22a. Fuel can flow across the rib web 14 through this gap 22a. The lower edge of the rib web 14 is also formed with recesses or cut-outs through which the stringer webs 8b pass. Fuel can also flow through the arched upper part 26 of each cut-out. Holes (not shown) may also be provided in the rib web 14 to minimise its weight and provide further routes for fuel to flow.

The cover assembly of FIG. 10 is formed by placing the various components on a mould in an un-cured or partly cured state. A vacuum bag is laid over the components on the mould, the space between the vacuum bag and the mould is evacuated to apply pressure, and the assembly is heated to cure the components. As the components cure, the various co-cured joints mentioned above (between the rib foot, stringer and cover) are formed. Also, within each rib foot 30 the bent blank is cured in contact with its respective contact part of the carrier strip, so that the blank and its respective contact part of the carrier strip become joined to each other by co-curing. As a result the contact part 3a of the carrier strip becomes an integral part of the finished article.

Although the invention has been described above with reference to one or more preferred embodiments, it will be appreciated that various changes or modifications may be made without departing from the scope of the invention as defined in the appended claims.

The invention claimed is:

1. A method of roll forming a plurality of composite components, the method including the steps:
   (a) laying a plurality of blanks onto a carrier strip, each blank including a stack of sheets of uncured composite material contacting a respective contact part of the carrier strip;
   (b) after step (a), forming the blanks and their respective contact parts of the carrier strip with a desired cross-sectional profile by passing the carrier strip carrying the blanks through a series of sets of rollers, each set of rollers performing an incremental part of a bending operation until the desired cross-sectional profile is obtained;
   (c) after step (b), separating each blank along with its respective contact part of the carrier strip from the rest of the carrier strip; and
   (d) before or after step (c), curing the blanks.

2. The method of claim 1, wherein the carrier strip is formed from an uncured material, and in step (d) each blank and its respective contact part of the carrier strip are cured in contact with each other so that they become joined to each other by co-curing.

3. The method of claim 1, wherein the carrier strip is formed from a composite material.

4. The method of claim 2, wherein the carrier strip is formed from the same uncured composite material as the blanks.

5. The method of claim 1, wherein each contact part of the carrier strip is surrounded on all sides by a respective surplus part of the carrier strip which is not contacted by a blank and which is separated from the contact part of the carrier strip in step (c).

6. The method of claim 1, wherein the bending operation forms one or more bends in the blanks and their respective contact parts of the carrier strip, and the method further comprises forming one or more further bends in the blanks and their respective contact parts of the carrier strip after step (c) and before step (d).

7. The method of claim 1, wherein the carrier strip has a thickness which is less than a thickness of the blanks.

8. The method of claim 1, wherein the carrier strip has a thickness greater than or equal to 1 mm.

9. The method of claim 1, wherein the carrier strip has a thickness less than or equal to 5 mm.

10. The method of claim 1, wherein step (c) comprises cutting the carrier strip.

11. The method of claim 10, wherein step (c) comprises cutting the carrier strip around a full periphery of the blank.

12. The method of claim 1, wherein the blanks are cured in step (d) after they have been separated from the carrier strip in step (c).

* * * * *